(12) United States Patent
Salowey et al.

(10) Patent No.: US 9,298,923 B2
(45) Date of Patent: Mar. 29, 2016

(54) SOFTWARE REVOCATION INFRASTRUCTURE

(71) Applicant: Cisco Technology, Inc., San Jose, CA (US)

(72) Inventors: Joseph Salowey, Seattle, WA (US); Max Pritikin, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 14/017,896

(22) Filed: Sep. 4, 2013

(65) Prior Publication Data

US 2015/0067323 A1 Mar. 5, 2015

(51) Int. Cl.
*G06F 21/57* (2013.01)
*G06F 21/12* (2013.01)
*H04L 9/32* (2006.01)

(52) U.S. Cl.
CPC .............. *G06F 21/57* (2013.01); *G06F 21/12* (2013.01); *H04L 9/3268* (2013.01)

(58) Field of Classification Search
CPC ....... G06F 21/10; G06F 21/12; G06F 21/121; G06F 21/44; G06F 21/50; G06F 21/51; G06F 21/52; G06F 21/57; G06F 8/65; G06F 8/70; G06F 8/71; G06F 21/30; G06F 21/31; G06F 21/45; G06F 2221/2131; G06F 21/105; H04W 12/06; H04L 63/083; H04L 63/0838; H04L 9/3268
See application file for complete search history.

(56) References Cited

U.S. PATENT DOCUMENTS

| | | | | |
|---|---|---|---|---|
| 6,148,401 | A * | 11/2000 | Devanbu et al. | 713/170 |
| 8,375,381 | B1 * | 2/2013 | Clark | G06F 8/71 717/170 |
| 8,572,730 | B1 * | 10/2013 | Sobel et al. | 726/22 |
| 8,954,732 | B1 * | 2/2015 | Watsen et al. | 713/157 |
| 8,955,152 | B1 * | 2/2015 | Enderwick et al. | 726/28 |
| 9,015,837 | B1 * | 4/2015 | De Los Reyes et al. | 726/23 |
| 9,043,922 | B1 * | 5/2015 | Dumitras | G06F 21/577 726/25 |
| 2002/0112179 | A1 * | 8/2002 | Riordan | G06F 21/554 726/26 |
| 2004/0003266 | A1 * | 1/2004 | Moshir et al. | 713/191 |
| 2004/0003390 | A1 * | 1/2004 | Canter et al. | 717/178 |
| 2004/0078565 | A1 * | 4/2004 | Hofmeister et al. | 713/156 |
| 2004/0193873 | A1 * | 9/2004 | England | 713/156 |
| 2005/0044401 | A1 * | 2/2005 | Morrow et al. | 713/200 |
| 2005/0268115 | A1 * | 12/2005 | Barde et al. | 713/189 |

(Continued)

FOREIGN PATENT DOCUMENTS

WO WO0210907 A1 2/2002

OTHER PUBLICATIONS

International Search Report and Written Opinion, from PCT/US2014/053052, Oct. 27, 2014, WO.

(Continued)

*Primary Examiner* — Darren B Schwartz
(74) *Attorney, Agent, or Firm* — Lempia Summerfield Katz LLC (57) ABSTRACT

In one implementation, software components include an identity of a revocation authority. Prior to loading of the software in a given platform, the revocation authority is checked for any revocation messages. The revocation authority creates software component specific messages for any software components to be revoked, rather than using certificate revocation or individual licenses. The messages include mitigation information, such as instructions for automatically configuring already installed software without requiring an update or change in code.

19 Claims, 3 Drawing Sheets

(56) References Cited

U.S. PATENT DOCUMENTS

| | | | |
|---|---|---|---|
| 2006/0048131 A1* | 3/2006 | Napier et al. | 717/168 |
| 2006/0075001 A1* | 4/2006 | Canning et al. | 707/203 |
| 2006/0156391 A1 | 7/2006 | Salowey | |
| 2007/0016961 A1* | 1/2007 | Vogler et al. | 726/30 |
| 2007/0033652 A1* | 2/2007 | Sherwani et al. | 726/26 |
| 2008/0195868 A1* | 8/2008 | Asokan | G06F 21/64 713/176 |
| 2008/0244747 A1* | 10/2008 | Gleichauf | G06F 11/1415 726/25 |
| 2009/0055817 A1* | 2/2009 | Maj | 717/173 |
| 2009/0210702 A1* | 8/2009 | Welingkar et al. | 713/156 |
| 2010/0275026 A1* | 10/2010 | McLean | 713/176 |
| 2010/0318968 A1* | 12/2010 | Traut | G06F 8/36 717/122 |
| 2014/0033193 A1* | 1/2014 | Palaniappan | 717/173 |
| 2014/0173737 A1* | 6/2014 | Toback | G06F 21/57 726/25 |
| 2014/0201843 A1* | 7/2014 | Hibbert | G06F 21/577 726/25 |
| 2014/0298452 A1* | 10/2014 | Heng | G06F 21/55 726/22 |

OTHER PUBLICATIONS

Automated Component Revocation and Renewal, Jun. 12, 2013, Microsoft.

* cited by examiner

SOFTWARE REVOCATION INFRASTRUCTURE

TECHNICAL FIELD

This disclosure relates in general to software revocation and, more particularly, to an infrastructure for revoking software.

BACKGROUND

Software is distributed to various platforms. The software may be updated or altered to deal with vulnerabilities or to provide additional features. Over time, the version of software on a given platform includes a collection of various components or updates. When a new software component is created for a next version, the software component is distributed to the platforms for updating. The update may undesirably create a vulnerability or other error in the software.

To avoid malicious alteration of software, many software components are digitally signed. Some systems or networks of platforms require signing all or some of their software components. Digital signing allows the platforms to determine the authenticity of the origin of the software. However, digital signing of the software components does not attest to the security or absence of security bugs in the software. It is common place for security defects to be found in software components that leave the component open to vulnerabilities that may be exploitable under certain conditions. If an attacker can cause a vulnerable, but signed, software component to be loaded, the system may be compromised. For security of the system, more than digital signing is used, such as processes to ensure that the software is of a version that is free of known vulnerabilities.

Revocation mechanisms are commonplace in public key infrastructure (PKI) environments. PKI may be used for signing software components. Revocation mechanisms may be used to revoke a signer's certificate. Software signed after a particular point in time is rendered invalid. This is a very coarse and draconian mechanism that can cause significant reconfiguration in the system to adapt to new trust roots and can invalidate unaffected secure software components, such as where the certificate is associated with secure software components as well as insecure components. Licensing mechanisms may allow revocation of individual software licenses using software component certificates, so requires license tracking for all the various platforms and certificates for all software components.

The threat response distribution protocol (TRDP) provides a way to communicate information about network-based threats and responses. This provides a mechanism for communicating actions to take to deal with software vulnerabilities, but leaves network administrators to transcribe and implement the action.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

Overview

Software components include an identity of a revocation authority. Prior to loading of the software in a given platform, the revocation authority is checked for any revocation messages. This loading check may be performed on a periodic ongoing basis. Loading may be for installing on a system or for loading a program into memory. Whenever the signature is checked, the revocation is typically checked if the revocation information is available. The revocation authority creates software component specific messages for any software components to be revoked, rather than using certificate revocation or individual licenses. The messages include mitigation information, such as instructions for automatically configuring already installed software without requiring an update or change in code.

In one aspect, a method is provided. Multiple instances of a signed software component are distributed over a network to multiple devices. The instances include an identification of a revocation authority. A processor of the revocation authority receives a request for a revocation message of the signed software component. The processor transmits the revocation message in response to the request. The revocation message includes mitigation information for configuration of the signed software component on one of the devices and includes a signature.

In a second aspect, logic is encoded in one or more non-transitory computer-readable media that includes code for execution. When executed by a processor, the code is operable to perform operations including activating a software component on a platform, the software component including a first signature and having a version, verifying that the first signature is valid and rooted in a trusted signing certificate, checking for revocation of the version of the software component, receiving mitigation information when the version is revoked, and processing the mitigation information for the software component.

In a third aspect, logic is encoded in one or more non-transitory computer-readable media that includes code for execution. When executed by a processor, the code is operable to perform operations including distributing a signed revocation message comprising mitigation information for a vulnerability of software. The mitigation information includes one or more instructions for automatic mitigation by a platform loading the software.

Example Embodiments

A platform that securely loads software contains trust roots used to authenticate the source and integrity of the software. Revocation services are provided for these signed software components.

Vulnerability and/or mitigation information is distributed in signed revocation messages. There are numerous data formats used to carry vulnerability and mitigation information. A set of trust roots in a platform are used to validate software revocation messages. These software revocation trust roots identify one or more authorities that are allowed to provide the software revocation mechanisms. This allows signed software components to be revoked in a trusted manner instead of having to revoke the certificates used to sign the components. It also provides a mechanism to communicate the status of software updates and a way to remediate software without managing individual licenses. It is possible that, for a particular component, the revocation authority or agent is a third party, such as a corporate IT department or international CERT.

Signed software that has security vulnerabilities is revoked in a manner similar to a PKI revocation mechanism. Automatic action for mitigation may be performed in a system. This revocation infrastructure allows for revocation of specific software component versions, allows for triggering automatic update of software based on expiration of revocation list information, and/or allows for automated response to software vulnerabilities including updates and other mitigating actions.

Digital rights management (DRM) and licensing of software may not provide security. Licensing results in a different level of granularity. Software licensing allows revocation of an individual software license rather than all instances of a particular signed software. Additionally, the licensing uses certificates issued to the software components themselves rather than signatures. The revocation mechanism for licensing is to revoke these certificates using certification revoke lists (CRLs). In many software signing models, software components do not have certificates. Revoking the certificate would not fix software components without certificates. The components are instead signed by a code signing certificate. Revoking the code signing certificate may revoke multiple components, including secure components. In other models, components may also be signed using a pretty good privacy (PGP) key or some other mechanism that does not directly make use of certificates, so certificate revocation is unavailable. In licensing, remediation may merely be by link to a URL. Because revocation as opposed to licensing is provided to address vulnerabilities found in the software rather than licensing, information related to the vulnerability and mitigation is included in a revocation record. The information may include a URL, but may also contain detailed information such as common vulnerability exposure number (CVE#) or other security related information and information about mitigations that may be applied without updating a component.

Figure 1:
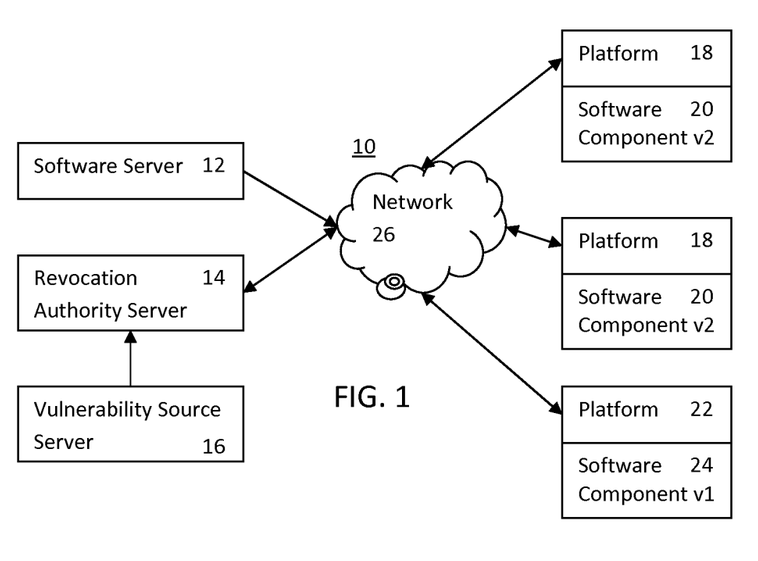
FIG. 1 is a simplified block diagram of an example infrastructure for software revocation.

FIG. 1 shows one embodiment of a software revocation infrastructure. A software server 12 distributes software and software components to platforms 18, 22 over a network 26. A revocation authority server 14 manages revocation messages requested by and/or transmitted to the platforms 18, 22. A vulnerability source server 16 provides revocation messages, mitigation, vulnerability, or other revocation related information to the revocation authority server 14. Additional, different, or fewer network devices may be provided. For example, more than one network 26 or other transports are used for messaging. As another example, additional platforms 18, 22 are provided. Different systems of platforms and/or servers 12, 14, 16 may use the same or different networks. In yet another example, any two or all of the servers 12, 14, 16 are a same server.

The servers 12, 14, 16 are processors, routers, switches, firewalls, and/or other servers responding to client requests. In other embodiments, the servers do not respond to requests but instead serve information by pushing to clients, such as the platforms 18, 22 and/or other servers 12, 14, 16.

The software server 12 is a source of the software components. The source may be an originator or a distributor of the software. For example, the software server 12 hosts applications created by others. As another example, the software server 12 manages a system or network of the platforms 18, 22 and distributes software to the platforms 18, 22. In other embodiments, the software server 12 is a server of a company or entity creating and distributing the software, such as a server of a medical imaging company connected with imaging devices (platforms 18, 22).

The revocation authority server 14 keeps information about revocation of software components 20, 24. The information may be kept as individual revocation messages, one or more lists, compilation of messages, or other organization. The revocation information may be organized by component 20, 22, by platform 18, 22, or by another criterion.

The revocation authority server 14 is part of a service handling revocation. The service may be a security or vulnerability service, such as service from a third-party or system security response team. In other embodiments, the revocation authority server 14 is operated by the creator, distributor, or manager of the software components 20, 24 and/or the software server 12. For example, the revocation authority server 14 and the software server 12 are operated by platform providers, software component providers, and/or deployment integrators.

The vulnerability source server 16 identifies a vulnerability and/or mitigation for the vulnerability. The vulnerability source server 16 identifies and/or maintains information about software vulnerabilities.

The vulnerability source server 16 is operated by a security team or software monitors. An independent service may control the vulnerability source server 16, such as a product security incidence response team, MITRE Corporation, or other entity. For example, a mitigation to reduce or remove the vulnerability in a software component are developed (e.g., by a software originator). The vulnerability source server 16 serves this mitigation information to the revocation authority server 14 of the same entity or a different entity (e.g., a system, network, or platform manager). In other embodiments, the vulnerability source server 16 is not provided or is not separate from the revocation authority server 14 and/or software server 12. The vulnerability source server 16 is operated by an originator, provider, and distributor of the software components 20, 24.

The network 26 is a public or private network. Local area, wide area or other networks may be used. In one embodiment, the network 26 is the Internet. In other embodiments, the network 26 is a cellular, call center, company specific, enterprise, or other network with limited access.

The platforms 18, 22 load and run the software components 20, 22. The software components 20, 24 are received from the software server 12 or another source. Similarly, updates or other changes to the code are received as software components 20, 24 from the software server 12 or the other source. The software components 20, 24 correspond to versions of the software. The same or different software is provided for the same or different types of platforms 18, 22. Due to connectivity, times of different connections, level of software purchased, license obtained, or other differences, a same type of platform (e.g., platform 18 and platform 22) may have different versions of the software components 20, 24.

The platforms 18, 22 are computers, processors, phones, tablets, lap tops, workstations, servers, or other device operating pursuant to the software. An operating system running on the platforms 18, 22 loads and allows control of the software by the platform 18, 22 or the user of the platform.

The software components 20, 24 are for any type of function. For example, the software components 20, 24 are for a game, business operation, email, calendar, or other type of application. As another example, the software components 20, 24 are for proprietary algorithms or processes.

A given software component 20 may be distributed to multiple platforms 18. Multiple instances of the software component 20 are created. The same software update or original program is received for use by the platforms 18. When a vulnerability is found by the distributor, monitor, or originator, the vulnerability is to be mitigated for security of the platform 18, the network 26, or a system 10 of servers and platforms.

Figure 2:
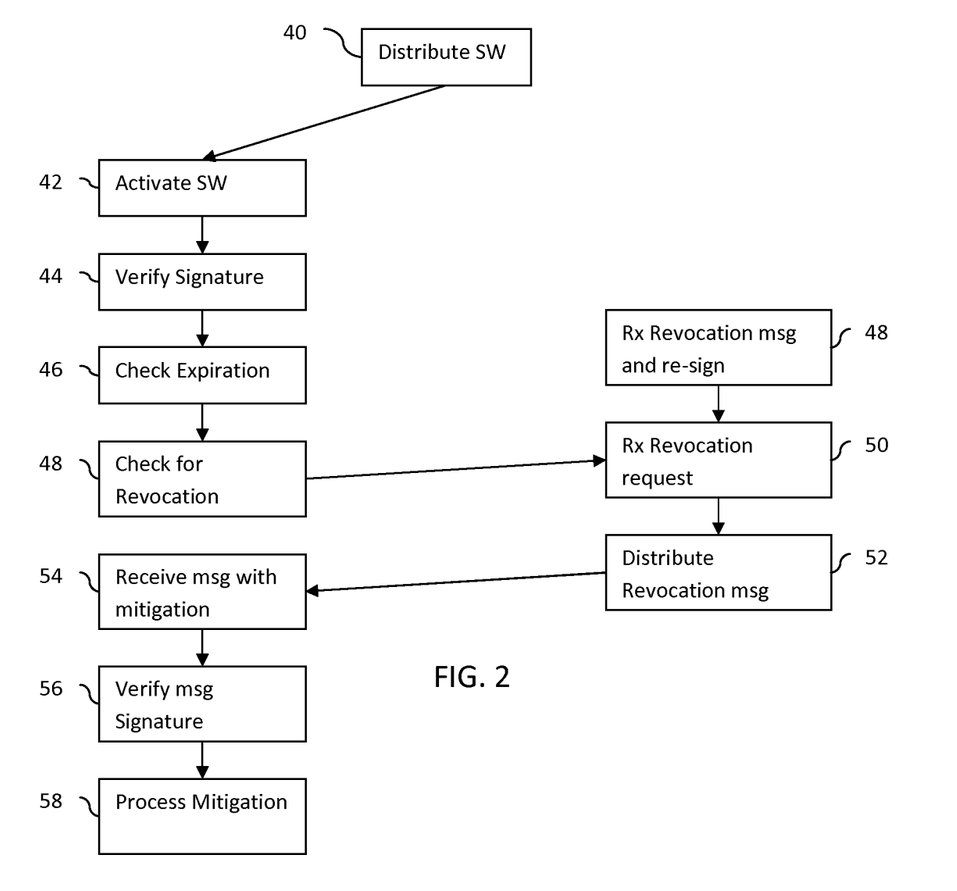
FIG. 2 is a flow chart of one embodiment of a method for software revocation.

The revocation authority server 14, in combination with information embedded in the software components and the platforms 18, 22, handles the mitigation. FIG. 2 shows an example method for managing revocation of software over a network. Revocation of specific software components, regardless of the individual ownership or licensing, is managed. Automated mitigation, such as re-configuring the software component, may be provided from a trusted source.

The method is implemented by the system of FIG. 1, or by other systems. Any of various devices and corresponding applications may implement all or portions of the method. For example, the acts in the left column are implemented by platforms, the act of the center column is implemented by a software server, and the acts of the right column are implemented by a revocation authority. The devices are configured by software or other program to implement the acts. A communications network is used for any messaging or communications between the devices.

Additional, different, or fewer acts may be provided. For example, the verifications of signature in acts 44 and/or 56 are not provided where the software components and/or revocation messages are not signed. In another example, the check for expiration of act 46 and/or activation of act 42 are not provided. Act 48 is optional.

The acts are performed in the order shown or a different order. For example, act 48 is performed prior to, simultaneously with, or after any of acts 40, 42, 44, or 46. Act 48 may be executed on cached revocation data such as a software revocation list. As another example, the verification of the signature of a software component of act 44 is performed upon install, so is performed prior to activation of the software in act 42.

The revocation is managed without revoking a certificate. A public signature may instead be revoked. The same signature is used for all or a sub-group of instances of a software component. The signature used to sign specific software components is revoked. For example, the systems, logic, and methods disclosed in U.S. Published Application No. 20140351581 (Ser. No. 13/898,936, filed May 21, 2013) is used. A two stage revocation process is used in a public key infrastructure. One stage authenticates or revokes the software component based on the status of the digital signature of the software component and another stage authenticates or revokes the software component based on the status of an individual signature by the digital certificate. For example, a digital certificate is assigned a certificate number. A serial number is assigned for a signature as signed by the digital certificate. The multiple instances of the software component include the certificate number and the serial number. Individual instances of the software component with the same signature may be revoked according to the serial number. Other revocation approaches may be used.

In act 40, the software component is distributed. The same software component is distributed to a plurality of devices. For example, an update is transmitted to multiple or all devices of a system. The update is to alter the code of the software. As another example, a first or initial software component is distributed, such as transmitting a copy of the software due to a purchase of the software. By downloading the software by different devices, the software is distributed to multiple devices.

The distribution is over a network. For example, electronic distribution is provided over a computer, cellular, or other network. The software components are transmitted over the network for installation on one or more devices. In alternative or additional embodiments, one or more instances of the software component are distributed by manual process, such as a user inputting a computer readable memory device in a computer for installing software.

The software components are signed. A PKI public signature generated with a certificate is added to the software component. Other signatures systems may be used. The signature is encrypted and used to ensure communications with trusted sources. Any signature type or approach may be used for verifying authenticity of software components to be installed on a device.

For revocation, each instance of the software component includes an identification of one or more revocation authorities, an expiration for revocation, and/or a revocation distribution mechanism. Additional, different, or fewer items may be included. The revocation information is included as metadata, but may be embedded in the software component.

The identity of the revocation authority is a pointer to a trust root. The identity is of a trusted source of revocation information. By including the identity, secure communications may be established with the revocation authority. The public key, symmetric key, x509 certificate, or other indicator of trust is identified.

The revocation distribution mechanism indicates how to access any revocation information that may exist for a given component. For example, the location of a revocation list distribution point or online status server address is provided as a uniform resource locator (URL) or other address. The indication may be used to request revocation information. Other mechanisms than server requests may be used, such as an indicator of a memory location or other location to look-up or access revocation information.

The expiration provides a time and/or date after which revocation information is unavailable for the software component. The software component should be upgraded before this time or date to be within maintenance. Otherwise, the software component expires due to lack of maintenance and cannot be used.

The identity and distribution mechanism are originated by one entity. This entity may interact to provide the revocation service. In other embodiments, the software components may be repackaged and signed by a new entity. For example, a platform may include of several software components from different vendors. The platform provider or network may sign the components under the certificate of the platform provider. New metadata may be included indicating different revocation authority information and expiration date. The platform provider or manager re-signs to provide a single source of revocation information despite different software components on the platforms being from different entities. In other embodiments, re-signing is not used and the separate entities manage revocation of the different software components independently.

As each software component is distributed, the software component is installed. Once installed, the software component may be activated, then loaded, and then operated on the device. Acts 44-58 are performed in response to activating in act 42, prior to loading. For example, a user of the device or the device itself activates by calling an executable file. The executable implements the revocation verification prior to loading the software. Alternatively, acts 44-58 are performed in response to activating in act 42, prior to installing. For example, the executable for installing the software component implements the revocation verification prior to installing. By implementing the revocation verification prior to loading and/or installing, any vulnerabilities caused by the software component may be avoided or mitigated.

In other embodiments, the software component initializes before revocation may be checked. For example, the software component is for a program for establishing communications. The communications are established prior to performing revocation checks. The check is deferred until after loading and/or installing. The loading or installing makes information available for retrieval. A period of vulnerability may exist as a result of the delay. Alternatively, the revocation information is provided before initialization, such as by pre-seeding. The revocation check may be performed prior to initialization.

In act 42, the software component is activated. For example, a user selects an icon or name in a menu. The selection indicates that the software, including the software component alone or multiple software components, is to be loaded and run. Other activations may be used. For example, a processor may call the software component based on running another process.

The activation begins a routine or process to load the software component. The code making up the software component is made available to a processor and the processor begins executing the code. The first lines of code may be for revocation verification. Alternatively, the loading routine or process calls for the revocation verification.

In act 44, the signature of the software component is verified. The public key used to validate the signature is trusted by the platform. The trust my come from direct knowledge of the public key or from a trusted root that signs the public key in a certificate. The signature is checked against the software it is signing. The signature was calculated by the signer over the software bundle using the private key associated with the public key. Any signature verification may be used.

Where multiple components make up an activated software program, the signatures of the various components are verified. In other embodiments, only one signature, such as for the most recent update software component, is available and is used for verification. Where multiple programs are activated, the same process occurs for each. In other embodiments, the signature verification is performed for installation but not subsequent loadings. In some cases, a single signature may cover several software programs.

If the verification of the signature fails, the software component is not loaded or installed. The component is marked as untrusted. If the verification of the signature passes, the devices checks for revocation information. The metadata or other location of the revocation information is accessed.

In act 46, the revocation information is checked for expiration. An automatic or set revocation based on time may be included. If there is an expiration date in the metadata, the device checks to see if the software component has expired. The current date or time is compared to an expiration date or time.

If expired, actions occur pursuant to a policy. As mentioned above, one appropriate action may be not loading the software component. If the software may operate without the particular component, then the other software is tested for expiration. Any other possible policies for expiration may be used. For example, an alert may be generated and sent, new software may be retrieved, or the component may be marked as untrusted.

If the software component has not expired, then a check for revocation is performed in act 48. The check is whether the software component has been revoked. Revoked in this context includes not just disabled or not to be used, but also software that is to be fixed or a vulnerability to be mitigated.

To check, a revocation message for the software component is obtained. The revocation message is obtained based on the mechanism indicated in the metadata or other revocation information of the software component. For example, a list of revocation messages is obtained from a revocation authority. As another example, the revocation authority (e.g., revocation service) checks for the revocation. Any mechanism to obtain the revocation information from the revocation authority may be used, such as the revocation authority pushing a list of revocation messages to any registered software component.

Regardless of the mechanism, a request for any revocation message appropriate for the software component is generated. The request is sent to the revocation authority or is implemented by the device to search an already obtained list. At some point, the revocation authority is requested to provide one or more revocation messages. The identity of the revocation authority is used to determine from where to obtain the revocation messages. The metadata associated with the software provides a mechanism to identify and trust the revocation authority. This may be through the use of a public key certificate trust root and the identity of the revocation authority. Alternatively, metadata may contain a public key and identity associated directly with the revocation authority.

If the revocation information for even checking is not available, one or more policies for dealing with the situation may be implemented. For example, any of the policies discussed above for expiration are implemented in response to no available check for revocation. Different software components may have different policies. For example, some components may have to initialize before revocation can be checked. The policy may create an exception for such software components.

When a defect is found in a software component, a security response team is notified, the problem is characterized, exploit and attack information are derived, the severity is determined, mitigations are developed, and/or vulnerable and not vulnerable versions are identified. At any point in this process, a revocation message may be generated. The message is generated by the revocation authority or is passed to the revocation authority. A group of entities may provide different or collaborative development of the vulnerability assessment.

In act 48, revocation messages created by others are received. Since the others are not associated with the trusted revocation authority for the device, the revocation message may be re-signed by the revocation authority or other entity with a signature from a certificate of the revocation authority. For example, the signature corresponds to a certificate of the signed software component. In other embodiments, a different certificate is used to generate the signature for the revocation message. Since the software component includes a pointer to a specific trust root, the resigning matches the signature of the revocation message to the trusted revocation authority.

In alternative embodiments, act 48 is not performed. Instead, the revocation message is generated and/or originally signed by the revocation authority. These messages may be cached locally by the platform.

In act 50, the request for a revocation message for the signed software component is received. The request is specific to the software component, such as identifying a serial number, license, or signature of the software component. In other embodiments, the request is for a list of revocation messages without specifically indicating a particular software component. Other information may be used to request a particular revocation message and/or list of such messages, such as the type of device running the software component, the network or system of which the device is a member, and/or a user status (e.g., purchaser of a full product).

The processor at the revocation authority processes the request. The request is formatted according to the revocation distribution mechanism. For example, the request is for the revocation authority to search for any revocation message for the particular software component. The revocation authority is requested to look-up a revocation message appropriate for the software component. As another example, the request is for the revocation authority to provide a list for all or a sub-set of revocation messages that may include a revocation message for the software component. In yet another example, the request may be formatted for registering the software component for pre-seeding or periodically receiving revocation messages regardless of loading. The revocation authority pushes revocation messages to registered software components or corresponding devices.

Since the request for the revocation message is received only if the software component of the device has not expired, messaging is minimized. In alternative embodiments, expiration is not checked or is checked after the check for revocation information.

In act 52, the revocation authority distributes a signed revocation message. The signature of the revocation message is a PKI or other signature, such as a signature generated similar to the signature used for the software component. The signature mechanism for the revocation message may be the same signature mechanism as used for the software component to which the revocation message applies. A different signature mechanism specific to the revocation message may be used. The revocation authority may sign the revocation message. Since the pointer to the trust root of the revocation authority is included with the software component, the signature by the revocation authority can be validated back to the trust root of that authority, establishing trust.

The processor, such as a processor of a server of the revocation authority, transmits the revocation message in response to the request. Periodic or other triggers for transmission of the revocation message may be used. The signed revocation message is formatted based on the distribution mechanism. The request to which the revocation message is a response is formatted based on the same distribution mechanism. The metadata or other information in the software component identifies how to access the list for the component. Instead of or in addition to distributing lists, software revocation may be available through an online revocation service.

The revocation message is distributed alone or in a list of such revocation messages. Any distribution may be used, such as broadcast or in response to specific requests. For example, a list of revocation messages is transmitted in response to a request for a client device. Since the client devices may load software components at different times, the requests are received at different times. Revocation lists are issued on a regular or irregular basis. The revocation list may contain the time the next update will be issued or may be silent about the next predicted time. Interim lists may be issued if a vulnerability is found between updates of the list.

The list of messages includes any revocation message for the particular software component as well as other revocation messages for other software components. Alternatively, the list includes only one or more revocation messages specific to the software component identified in the request. The scope of the revocation list is determined by the revocation authority.

The revocation message may include various information, such as the signature and mitigation information. Other information may include an identity of the software component for which a vulnerability has been identified, identity of a previous version without the vulnerability, attack vector information, severity information, and/or links to other information. Any combination of information may be included in the revocation message. Information used to identify that a software component is revoked and/or how to mitigate a vulnerability is provided in the revocation message.

In one embodiment, the revocation message contains a vulnerable code identity, a non-vulnerable code identity, vulnerability information, attack vector, severity, mitigation information, and a signature. The vulnerable code identity includes a reference for the software component, version(s) indication, release date, secure hash (e.g., SHA256), and signer, but may include different information. The signature provided with the software component may identify the software component, so is used as the reference. The non-vulnerable code identity may include the same or similar information as the vulnerable code identify, but for a newer or older non-vulnerable version. Other information may be included, such as a link (e.g., URL) to a location for downloading an update for the non-vulnerable code. Any vulnerability information may be used, such as a CVE#, a venders product security incidence response team link (PSIRT#), a URL or other link to reference information, and/or an identification of an organization that originated the revocation message (e.g., for re-signed revocation messages).

The attack vector, severity, and/or mitigation indicate a solution. The message may include information that characterizes the way the vulnerability can be exploited and how severe the exploit may be. The severity and/or attack vector may be used in mitigation. The attack vector and severity may indicate other vulnerabilities that can be chained to increase the severity. For example if the component or deployment is vulnerable to high severity CVE-xxxx-yyyy, then the severity label is high severity, if not then medium. The severity may be used with a policy to guide mitigation. Alternatively, the attack vector and severity are not indicated.

The revocation message may also include mitigating information. The mitigation information may include actions to modify the configuration or deployment or otherwise reduce or eliminate the vulnerability. The mitigation information may include instructions on disabling the component, installing a filtering monitor in front of the component, disabling network access to the component, removing permissions from the component, or triggering a change in some other system. Other now known or later developed mitigations may be provided. The mitigations may or may not include an update or change of code of the software component. Rather than changing code, the configuration or a value of one or more variables may be changed. The interpretation of the mitigation message and the configuration change may be done by the operating system or platform.

In one embodiment, the revocation message is provided to an administrator of the device, system, or network. The administrator of the device may be the user. The revocation message is sent for output or display to the user. The revocation message is sent as an alert that the device has a vulnerability. For example, the revocation message is sent as an administrative alert for handling. The revocation message includes mitigation information to assist the administrator in reducing, eliminating, or dealing with the vulnerability.

Rather than receiving the alert based on the schedule of the source of the alert, the alert is received upon use of the software component to which it applied.

In another embodiment, the revocation message is transmitted to the device with the software component. The mitigation information is useable automatically by the device. In the automated approach, the device processes the data in the revocation message. For example, the mitigation includes machine or device readable instructions for the configuration of the software component. The instructions allow for automatic mitigation by the device loading the software or by another device (e.g., network or system server). The instructions may not change the code (e.g., update) of the software component, but instead filter, change input or output data, or alter a configuration of the software component or other software of the device interacting with the software component. The behavior of the software component is altered without installing an update. Alternatively, the instructions are for an update to alter or roll back the software component to a different version.

In one example mitigation, the instructions are for filtering. For example, one or more input, output, or other filters are specified. The filters are applied to data used in or by the software component, network, or system to alter the data to avoid the vulnerability. The software component is filtered.

In other example mitigations, the signed software component is disabled, part of the signed software component is turned off, an interface is altered or reassigned, and/or a port is altered or reassigned. The mitigation may be for retrieving and updating to a different version of the software component (e.g., rolling back to a non vulnerable version).

The instructions may interact with system, network or device policy. An assessment as to the severity and risk of the vulnerability may be used to select the mitigation instructions for follow. The device may determine if there is a mitigating action that can be taken based on the severity.

The revocation message is for altering the software component or interaction with the software component. The format may be specific to the software component. In other embodiments, the revocation message is intercepted and altered or is formatted as transmitted for a particular device or network. For example, the revocation message includes instructions to interact with the operating system of the device. The revocation information may be processed by a vulnerability response team instead of a device. The response team may issue new revocation messages for a particular platform that have more specific mitigation information for that platform or may take action through another configuration mechanism, such as the operating system.

In act 54, the mitigation message or information extracted from the message is received by the device, user of the device, or administrator for the device. Where a list is transmitted, there may be no revocation message for the particular software component. Alternatively, a response indicating no revocation is received. The software component is then allowed to load.

Where a revocation message for the software component is received (i.e., where the software component has been revoked as currently configured), the revocation information is processed. The revocation information is for the software component in general or for any instance of the same version of the software component. The revocation information is not a revocation of a particular license or is not individual to a particular instance. The revocation information is processed to correct the vulnerability of the various instances of the software components.

In act 56, the signature of the revocation message is verified. To assure integrity, the signature is checked with a trust root of the revocation authority. The signature is verified in the same way as the signature of the software component, but a different verification mechanism may be used. For example, the signature may use a different signing algorithm. The verification of the signature checks against the trust root or public key information provided in the meta-data. More than one revocation authority may issue revocation messages for a component. A component may have meta-data associated with multiple revocation authorities.

In act 58, the mitigation information from the revocation message is processed. The administrator or user may manually process, such as altering a setting of the software component. For automated processing, the instructions are parsed. A processor of the device sequences through the instructions to configure the software component. The instruction may update, change code, add a filter, roll back, or perform other actions. In one embodiment, the instructions are for adding a filter or altering configuration without changing the instructions or code of the software component.

Other actions may be performed after mitigation. For example, a task may be set to check for additional revocation information while the software component is loaded or before the next load. The check is performed before a next update is scheduled to occur as further mitigation may be identified.

Figure 3:
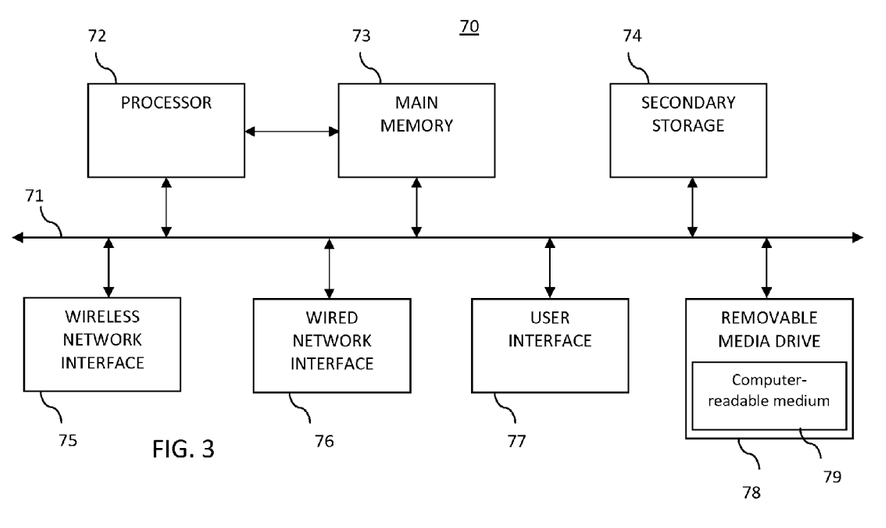
FIG. 3 is block diagram of a network device, according to one embodiment, for use in software revocation.

FIG. 3 is a simplified block diagram of an example network device (platform 18, 22, or servers 12, 14, 16), such as a general or special purpose computer. The network 10 (see FIG. 1) may be for a single domain (e.g., cisco.com) or multiple domains (e.g., cisco.com and pepsi.com). For example, the network may be a wide area network, local area network, intranet, extranet, wireless local area network, virtual local area network, or combinations of networks for one or more companies. Any form of network may be provided, such as transport networks, enterprise, data center, or other wired or wireless network. The network 10 may be applicable across platforms, extensible, and/or adaptive to specific platform and/or technology requirements through link-negotiation of connectivity.

The network 10 may be relatively static, such as the same platforms 18, 22 being provided over minutes, days, weeks, or years. Network devices (e.g., platforms 18, 22) may be occasionally added or replaced. In other embodiments, the network 10 is dynamic, such as allowing network devices to be added or removed frequently. For example, mobile network elements may connect or disconnect from the network 10 throughout a day.

The network devices are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

In FIG. 5, the example network apparatus or device 70 corresponds to network elements or computing devices that may be deployed in the network 10. The network device 70 includes software and/or hardware to perform any one or more of the activities or operations for the revocation infrastructure.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices. For example, the network device 70 may include another processor and/or not include the secondary storage 74 or removable media drive 78. Each network device may include more or less components than other network devices.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any nonvolatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices 12, 14 via one or more networks. In one example, the wireless network interface 75 includes a wireless network controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include a medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

One or more of the memories 73, 74, 79, or another memory stores the software component, metadata, revocation message, mitigation instructions, policies, requests, responses, or other information used for the revocation infrastructure. One or more memories 73, 74, 79, or another memory may store a signature, certificate, or other trust information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   distributing, over a network, multiple instances of a signed software component to multiple devices, the instances including an identification of a revocation authority;
   noting, by a processor of the revocation authority, a vulnerability in a version of the signed software component;
   identifying, by the processor of the revocation authority, a first signature that was used to sign the version of the signed software component;
   receiving a request, at the processor of the revocation authority, for a revocation message of the signed software component; and
   transmitting, by the processor of the revocation authority, the revocation message in response to the request, the revocation message including mitigation information only for the version of the signed software component that is signed by the first signature on one or more of the devices and including a second signature; wherein the mitigation information includes information to reduce or remove the vulnerability; wherein the revocation message disables the version of the signed software component until the vulnerability has been mitigated.

2. The method of claim 1 wherein distributing comprises distributing the signed software component comprises transmitting over the network.

3. The method of claim 1 wherein distributing comprises distributing with the instances including an expiration for revocation, and wherein the requests are received only for instances that are not past the expiration for the revocation.

4. The method of claim 1 wherein distributing comprises distributing with the instances including a revocation distribution mechanism, and wherein receiving comprises receiving the requests formatted according to the revocation distribution mechanism.

5. The method of claim 1 wherein receiving comprises receiving the requests as requests for a list including the revocation message.

6. The method of claim 1 wherein receiving comprises receiving the requests as look-ups from a list of revocation messages, including the revocation message, served by the revocation authority.

7. The method of claim 1 wherein transmitting comprises transmitting the revocation message in a list of other revocation messages, the other revocation messages being for other signed software components than the signed software component.

8. The method of claim 1 wherein transmitting comprises transmitting with the mitigation information for the configuration by filtering operation of the signed software component.

9. The method of claim 1 wherein transmitting comprises transmitting with the mitigation information for the configuration by changing behavior of the signed software component without installing an update of the signed software component, the change in behavior comprising disabling the signed software component, turning off part of the signed software component, altering an interface, altering a port, or combinations thereof.

10. The method of claim 1 further comprising:
receiving the revocation message from a third-party and re-signing the revocation message with the second signature, the second signature corresponding to a certificate of an authority trusted to redistribute revocation messages.

11. The method of claim 1 wherein transmitting comprises transmitting to an administrator for the device.

12. The method of claim 1 wherein transmitting comprises transmitting to the device, the mitigation information useable automatically by the device for the configuration.

13. The method of claim 1 wherein transmitting comprises transmitting the revocations message altered for an operating system of the one device.

14. Logic encoded in one or more non-transitory computer-readable media that includes code for execution and when executed by a processor is operable to perform operations comprising:
activating, by the processor, a software component on a platform, the software component including a first signature and having a version;
verifying, by the processor, that the first signature is valid and rooted in a trusted signing certificate;
checking, by the processor, for expiration of the software component;
checking, by the processor, for revocation of the version of the software component by a revocation authority, wherein the first signature is used to identify the version of the software component, wherein revocation disables the software component from loading;
receiving mitigation information, from the revocation authority, when the version is revoked, the mitigation information including includes information to reduce or remove a vulnerability in the version of the software component;
implementing, by the processor, the mitigation information for the software component; and
loading, by the processor, the software component.

15. The logic of claim 14 wherein activating, verifying, checking, receiving and implementing are performed prior to loading or installing the software component on the platform.

16. The logic of claim 14 further comprising verifying a second signature of the mitigation information after receiving the mitigation information.

17. The logic of claim 14 wherein processing the mitigation information comprises automatically configuring the software component without changing instruction code of the software component.

18. The logic of claim 14 wherein receiving the mitigation information comprises receiving a revocation message for the version of the software component and not for a certificate or a license.

19. Logic encoded in one or more non-transitory computer-readable media that includes code for execution and when executed by a processor is operable to perform operations comprising:
receiving, by a processor of a revocation authority, a message indicating that a version of software has a vulnerability;
identifying, by the processor of a revocation authority, a signature used to sign the version of software;
receiving, by the processor of a revocation authority, a request formatted pursuant to a distribution mechanism identified in metadata of the version of software
distributing, by the processor of a revocation authority, to a device, a signed revocation message comprising mitigation information for the vulnerability of the version of software signed by the signature, the mitigation information including one or more instructions for automatic mitigation by a platform loading the version of software signed by the signature; wherein the revocation message disables the device from loading the version of software signed by the signature; wherein the one or more instructions include instructions to reduce or remove the vulnerability in the version of the software component without changing code of the software.

* * * * *